(12) United States Patent
Jones, III

(10) Patent No.: US 11,319,028 B2
(45) Date of Patent: May 3, 2022

(54) APPARATUS AND SYSTEM FOR SECURING AN ACCESSORY TO AN OBJECT

(71) Applicant: Oliver L Jones, III, Palm Beach Gardens, FL (US)

(72) Inventor: Oliver L Jones, III, Palm Beach Gardens, FL (US)

(\*) Notice: Subject to any disclaimer, the term of this patent is extended or adjusted under 35 U.S.C. 154(b) by 108 days.

(21) Appl. No.: 16/926,210

(22) Filed: Jul. 10, 2020

(65) Prior Publication Data

US 2021/0016855 A1 Jan. 21, 2021

Related U.S. Application Data

(60) Provisional application No. 62/875,460, filed on Jul. 17, 2019.

(51) Int. Cl.
| | |
|---|---|
| *B63B 21/04* | (2006.01) |
| *B63B 21/30* | (2006.01) |
| *B63B 21/24* | (2006.01) |
| *B63B 21/58* | (2006.01) |

(52) U.S. Cl.
CPC ............ *B63B 21/04* (2013.01); *B63B 21/243* (2013.01); *B63B 21/30* (2013.01); *B63B 21/58* (2013.01)

(58) Field of Classification Search
CPC ....... B63B 21/04; B63B 21/243; B63B 21/30; B63B 21/58; B63B 27/14; B63B 27/146

USPC .......................................... 114/343, 362, 382
See application file for complete search history.

(56) References Cited

U.S. PATENT DOCUMENTS

| | | | | |
|---|---|---|---|---|
| 2,566,725 A | \* | 9/1951 | Hoadley | ................. H01R 11/15 439/785 |
| 3,484,066 A | \* | 12/1969 | Aunspaugh | ............ A01K 97/10 248/541 |
| 6,887,015 B1 | \* | 5/2005 | Blair | ....................... B63B 59/02 405/215 |

\* cited by examiner

*Primary Examiner* — Daniel V Venne
(74) *Attorney, Agent, or Firm* — John L Doughty; Doughty Law, L.L.C.

(57) ABSTRACT

A restraining device, such as a bolt, pin, or latch, removably secures a connector sleeve to a U-bolt, such as a tow-rope-eyelet on the bow of a boat hull. The connector sleeve is machined with an internal cavity having surfaces and dimension that correspond to outer surfaces of the U-bolt. The sleeve contains holes through which the restraining device passes after the sleeve has been slid over the U-bolt such that the restraining device, while installed, prevents the sleeve from sliding back off of the U-bolt. The sleeve also includes accessory mount holes to receive restraining devices that attach an accessory, such as a ladder, to the sleeve and thus to the boat via the sleeve that has been secured thereto. The sleeve may provide for set screws to snug the sleeve to the U-bolt if clearance exists between surfaces of the cavity and the U-bolt.

18 Claims, 16 Drawing Sheets

APPARATUS AND SYSTEM FOR SECURING AN ACCESSORY TO AN OBJECT

CROSS REFERENCE TO RELATED APPLICATION

This application claims priority under 35 U.S.C. 119(e) to U.S. provisional patent application No. 62/875,460 entitled "Apparatus and system for securing an accessory to an object," which was filed Jul. 17, 2019, and which is incorporated herein by reference in its entirety.

FIELD

The field relates to removably attaching apparatuses and accessories to vehicles, for example to an existing U-bolt that is used as a bow eye or towing eye of a boat. An apparatus, or article of manufacture, facilitates removably attaching ladders, steps, platforms, shelves, tables, and/or shade structures and various other apparatuses to a boat, vessel, or other vehicle in a desired orientation.

BACKGROUND

Many boat or vessel owners will often anchor with the bow of their boat on land or over shallow water while the stern of their boat is over deeper water for various reason. In these instances, it is often preferred to disembark and board the boat from the bow. Traditionally ladders, steps and other apparatuses have been available for use on the bow and stern of boats.

However, these ladders, steps and other apparatuses can require mounting hardware to be permanently attached to the bow, foredeck, or stern of a boat. Many boat owners see the need to drill into or otherwise alter their boats and permanently attach additional hardware as a drawback. Another drawback is the permanently attached hardware can be a safety hazard for the captain and passengers moving about or on and off the vessel.

Therefore, a need exists in the field for a novel device or assembly capable of quickly and removably attaching ladders, steps, shade structures, or other apparatuses to anchor points commonly found on boats eliminating the need altering a boat or permanently adding additional hardware to a boat. A further need exists to be able to quickly change and re-secure the position of the ladder, steps, shade structure, or other apparatuses for optimal use.

One or more U-bolts are often mounted through the bow and transom of boats. These U-bolts are mounted through what is typically the thickest and strongest points of the hull and are used for towing or lifting the vessel.

SUMMARY

In an aspect a novel U-bolt connector sleeve and/or assembly, which may be an article of manufacture, locates several contact interface points for interface with a U-bolt that is fixed to a vessel, typically permanently, to significantly constrain the U-bolt connector sleeve's movement in relation to the U-bolt. At least one of these interface points of contact exists when a restraining device, such as a bolt or a pin or a latch, is located by the connector sleeve against the inner radius of the U-bolt providing a temporarily rigid attachment of the U-bolt connector sleeve and/or assembly to the bow or transom of a boat. Ladders, steps, shade structures, or other apparatus can then be attached to the U-bolt connector sleeve and/or assembly. In an aspect, the connector sleeve also has surfaces or contact points which engage and interface with the top, bottom, and side surfaces of the parallel arms of a U-bolt and the outer radius and inner radius of a U-bolt as shown in FIG. 2. In an aspect, the U-bolt connector sleeve may be manufactured with set screws to provide adjustable contact points as shown in FIG. 14. In an aspect, the U-bolt connector sleeve may be manufactured with an inner cavity that has a slight clearance fit, or to have an interference, or press fit, between each of the top, bottom, and side surfaces of the parallel arms of a U-bolt. The connector sleeve may also interface with the U-bolt such that a slight clearance fit, or an interference fit exists with each of the outer radius and inner radius of a U-bolt when a restraining device removably secures the connector sleeve to the U-bolt. In an aspect, the maximum clearance may be no more than 0.10". In another aspect a system that includes the connector sleeve may incorporate a bow brace feature or component as shown in FIG. 11, in which case minimizing clearance between the connector sleeve and outer radius and inner radius of the U-bolt may not be as important as when contact between surfaces of the connector sleeve and restraining device and the surfaces of the U-bolt are the only interface points that removably secure the connector sleeve to the U-bolt and thus to the vessel/vehicle.

The U-bolt connector sleeve locates the restraining device in contact with a surface of the inner radius of a U-bolt in a manner that facilitates the restraining device being easily removed from the connector sleeve to allow the U-bolt connector sleeve to be placed onto, fixed to, and removed from a U-bolt as needed while also being securely retained in the connector sleeve until a user chooses to remove the restraining device to remove the accessory that may be temporarily mounted to the vessel. The U-bolt connector sleeve's contact points on the U-bolt's outer and inner radius significantly eliminate the U-bolt connector sleeve's movement in the Z direction in relation to the U-bolt. The U-bolt connector sleeve's contact points on the top and bottom surfaces of the U-bolt's parallel arms significantly eliminate movement of the U-bolt connector sleeve in the X direction in relation to a U-bolt. The U-bolt connector sleeve's contact points on the side surfaces of the U-bolt's parallel arms significantly eliminate movement of the U-bolt connector sleeve in the Y direction in relation to the U-bolt. The contact points can take on different geometries and can be adjustable. There are many other possible uses for rigid attachment to U-bolts. The assembly can incorporate features that allow the ladder/steps mounting surface to clear the bow and sides of a boat and to be easily and securely repositioned of optimal use.

BRIEF DESCRIPTION OF THE DRAWINGS

Some of the embodiments are illustrated as an example and are not limited by figures of the accompanying drawings, in which like references may indicate similar elements and in which.

DETAILED DESCRIPTION

Figure 1:
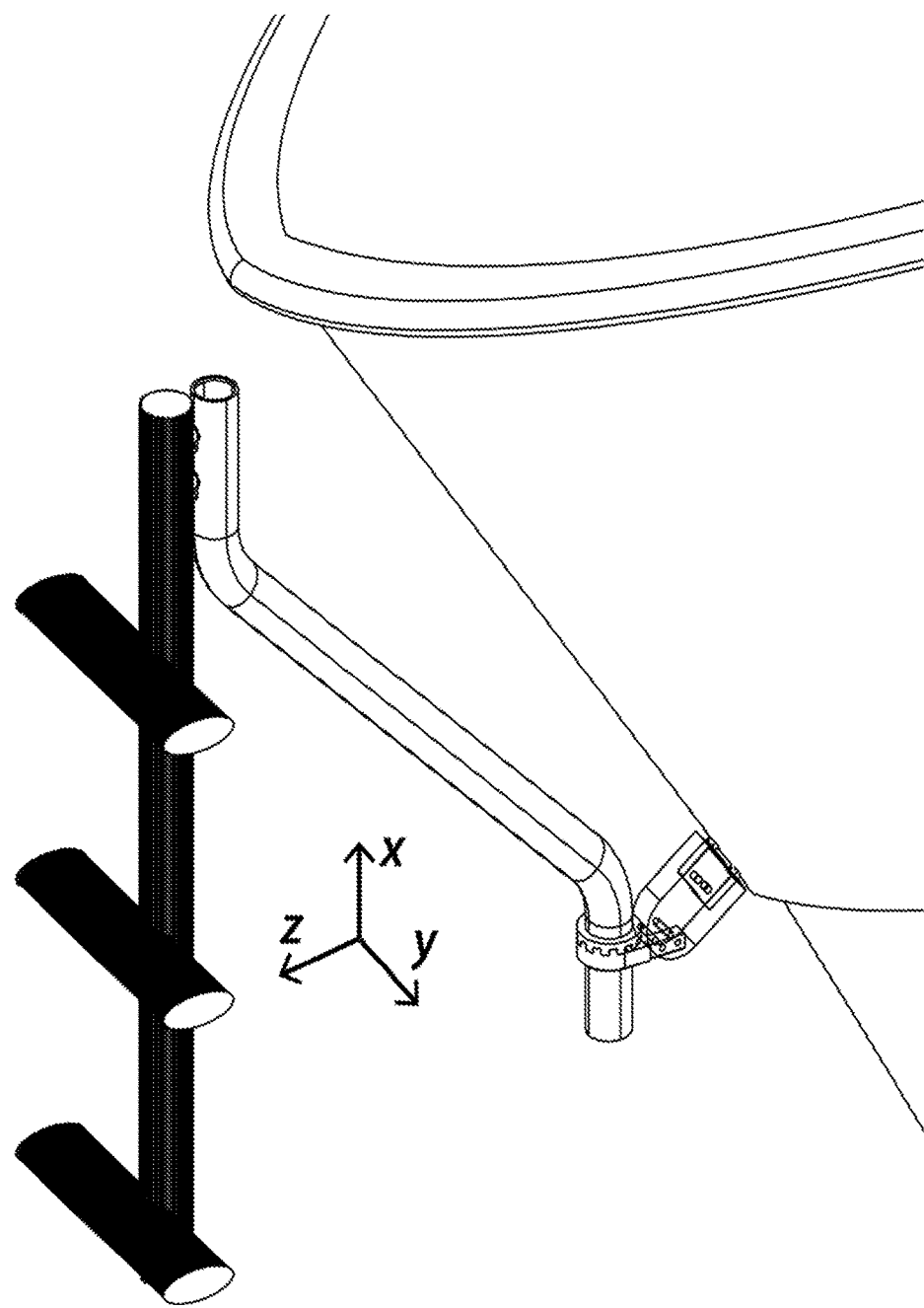
FIG. 1 illustrates one example of the U-bolt connector sleeve with an adjustable ladder mount assembly and ladder attached to a U-Bolt mounted in the bow of a boat according to various embodiments of the present invention.

As a preliminary matter, it will be readily understood by those persons skilled in the art that the present invention is susceptible of broad utility and application. Many methods, embodiments, and adaptations of the present invention other than those herein described as well as many variations, modifications and equivalent arrangements, will be apparent from or reasonably suggested by the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise exclude any such other embodiments, adaptations, variations, modifications and equivalent arrangements, the present invention being limited only by the claims appended hereto and the equivalents thereof.

The terminology used herein is for purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical, scientific, and nautical terms) used herein have the same meaning as commonly understood by one having ordinary skill in the art to which the aspects described herein belong. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

It will be understood that a number of techniques and steps are disclosed. Each of these has individual benefit and each can also be used in conjunction with one or more, or in some cases all, of the other disclosed techniques. Accordingly, for the sake of clarity, this description refrains from repeating every possible combination of the individual steps in an unnecessary fashion. Nevertheless, the specification and claims should be read with the understanding that such combinations are entirely within the scope of the invention and the claims.

New devices, assemblies, apparatuses, and methods for temporarily, removably, rigidly attaching ladders, steps, shade structures, and/or other apparatuses are described herein.

Figure 1A:
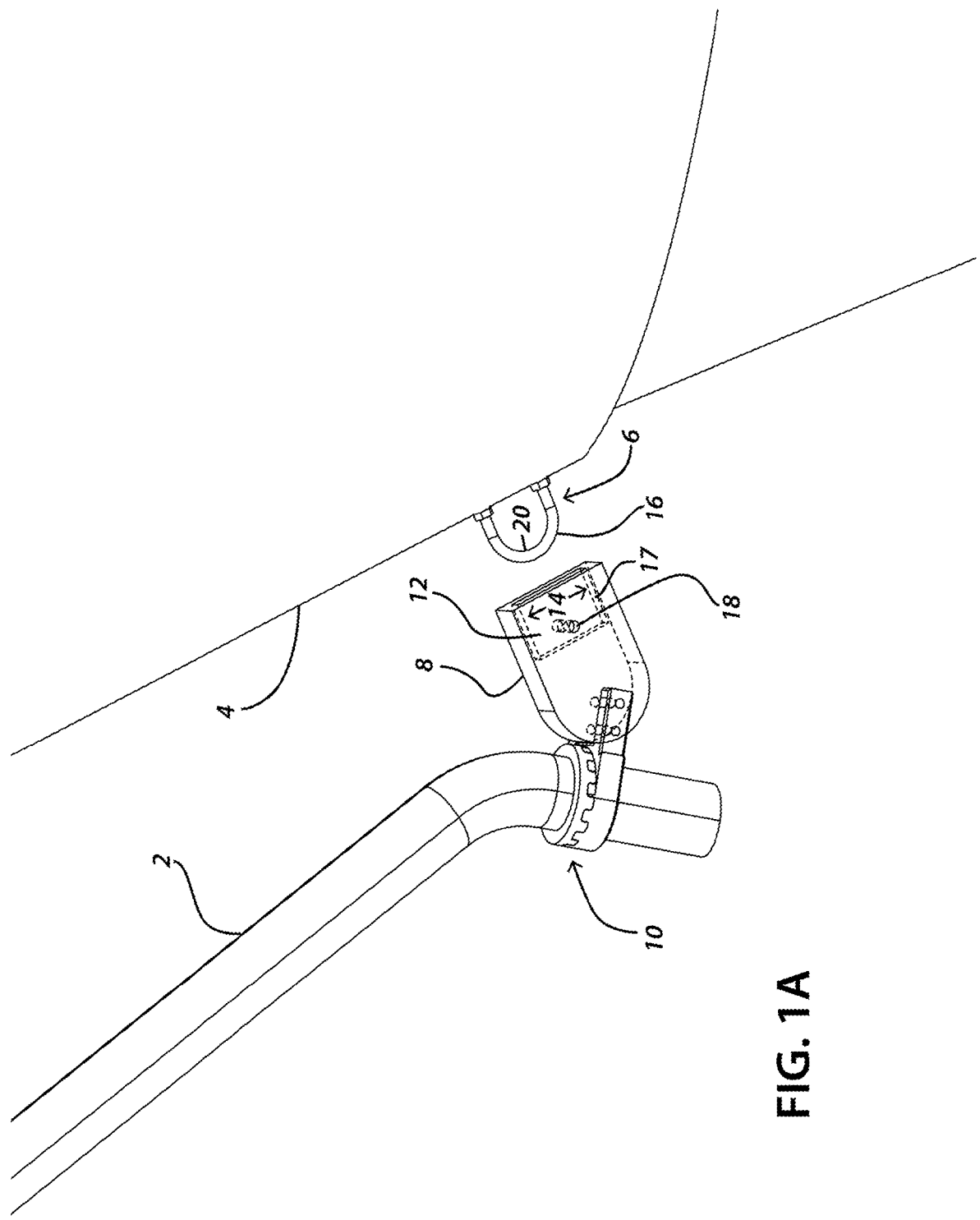
FIG. 1A illustrates a close-up view of ladder, an adjustable ladder mount assembly, and U-bolt connector sleeve rigidly attached to a U-bolt mounted in the bow of a boat.

Turning now to the figure, FIG. 1A depicts a close-up view of a ladder mount 2, adjustable ladder mount holder 10, and U-bolt connector sleeve 8 about to be removably rigidly secured, or attached, to a U-bolt 6 mounted in the bow of a boat 4. U-bolt connector sleeve 8 may define surfaces of cavity 12 in a proximal end of the sleeve (i.e., close to boat 4) each with an interference fit, or press fit, or with a clearance fit with preferably no more than 0.10" clearance between each of the outer radius, inner radius, top of the parallel arm, bottom of the parallel arm, and sides of the parallel arms of a U-bolt 6. It will be appreciated that instead of a clearance between inner surfaces of cavity 12 and U-bolt 6, the cavity 12 may be formed such that one or more of the inner surfaces thereof may produce an interference, or press fit, with one or more of the corresponding outer radius, inner radius, top of the parallel arm, bottom of the parallel arm, and sides of the parallel arms of a U-bolt 6 when sleeve 8 has been slid, or moved into a position to be secured, over U-bolt 6. Having contact surfaces within cavity 12 of U-bolt connector sleeve 8 in very minimal clearance fit, or a slight interference fit, when sleeve 8 is fit over U-bolt 6 significantly eliminates movement of the U-bolt connector sleeve in relation to the U-bolt. For example, contact edges/outer surfaces 16A and 16B of U-bolt 6 may have a slight interference fit, or very slight clearance fit, against/with top and bottom inner surfaces 17A and 17B of cavity 12. (See FIG. 2 for more detailed view of surfaces 16A and 16B, and 17A and 17B.) It will be appreciated that inner surfaces 17A and 17B of cavity 12 may be machined as flat surfaces such that the inner surfaces contact outer surfaces 16A and 16B, respectively, at contact edges of the outer surfaces. Or, inner surfaces 17A and 17B of cavity 12 may be machined as curved surfaces such that the inner surfaces contact outer surfaces 16A and 16B, respectively, at contact patches that comprise more surface area than an edge. A pin or bolt, or other restraining device, may be inserted through passage 18 defined in sleeve 8 to apply/create a slight clearance fit with the U-bolt's inner radius, surface 20. Surface 24 of U-bolt 6 may have a slight interference fit, or very slight clearance fit, against/with surface 26 (see, FIG. 2) of cavity 12 and thus, in cooperation with contact between surfaces 16A and B and 17 A and B, and contact between a pin or bolt, or other restraining device inserted through passage 18 and surface 20, substantially removably rigidly couples and secures sleeve 8 to U-bolt 6. The pin, bolt, or other restraining device can be easily withdrawn from passage 18 in sleeve 8 to remove contact between the restraining device and the U-bolt's inner radius surface 20 and thus facilitate removal of sleeve 8 from being mounted to boat hull 4 via U-bolt 6. It will be appreciated, as shown more clearly in other figures herein, that because passage 18 locates a restraining device that passes though cavity 12 of sleeve 8 the passage typically comprises a first passage defined in one wall of the cavity, for example the wall as seen in the view of FIG. 1A, and a corresponding second passage in a corresponding back wall of sleeve 8 that defines cavity 12, which would be a back side wall as viewed in FIG. 1A. It will be appreciated that passage(s) 18 may be referred to herein as opening(s), hole(s), or other similar nomenclature (passages 22 may be referred to with similar language) for methods or means for locating a restraining device, such as a bolt or a pin, in substantially secure/restraining contact with an inner surface 20 of U-bolt 6 when sleeve 8 is mounted to the U-bolt such that the sleeve, and an accessory mounted to it at a distal end, is removably securely attached to boat hull 4. Adjustable ladder mount assembly 10 may incorporate male and female teeth or indexing flanges to allow the ladder mount to be quickly and securely positioned and repositioned while sleeve 8 is coupled to U-bolt 6 using a restraining device though passage 18. The ladder mount may incorporate an offset portion, including bends in the main ladder tube, to mount the ladder at an elevation and distance from U-bolt 6 so that the ladder clears bow 4 and sides of the boat and is roughly perpendicular to the gunnel of the boat.

Figure 2:
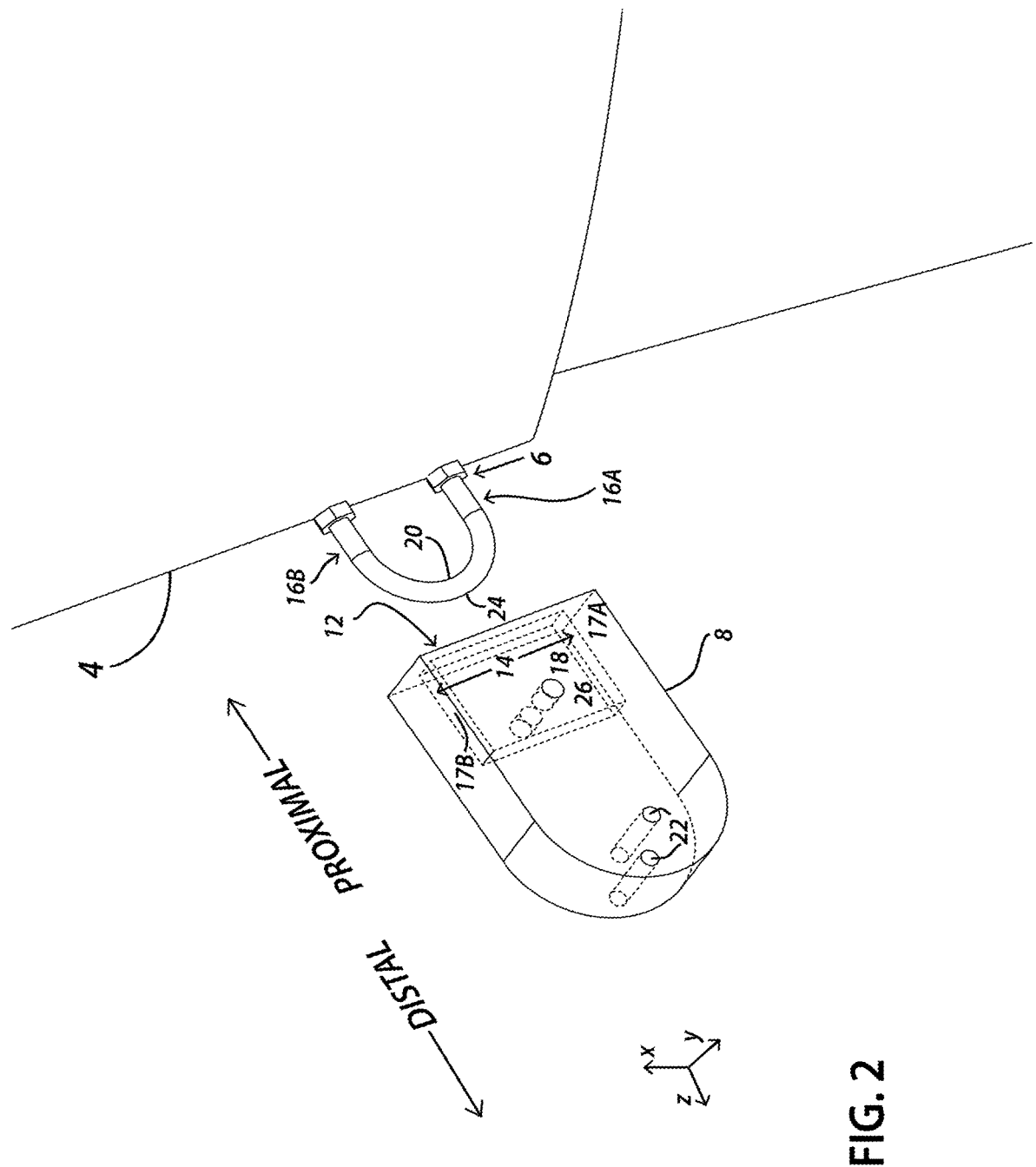
FIG. 2 illustrates one example of the contact surfaces in the U-bolt connector sleeve and the U-bolt which significantly limit the U-bolt connector sleeve's movement in relation to a U-bolt according to various embodiments described herein.

FIG. 2 depicts a close-up view of a U-bolt connector sleeve and a U-bolt mounted in the bow of a boat. FIG. 2 labels the contact surfaces between the U-bolt connector sleeve 8 and U-bolt 6 which removably rigidly restrain movement of the two devices in relationship to each other. The clearance between these contact points or surfaces will preferably be no greater than 0.10", or may produce an interference or press fit between any of the paired contact points or surfaces. Surface 26 and passage 18 in U-bolt connector sleeve 6 cooperate with U-bolt outer radius surface 24 and U-bolt inner radius surface 20, respectively, to substantially restrain relational movement in the Z direction. Surfaces 17A and 17B of U-bolt connector sleeve 8 cooperate with surfaces 16A and 16B on parallel 'arms' of U-bolt 6 to substantially restrain relational movement in the X direction. A restraining device through opening 18 in U-bolt connector sleeve 8 can be quickly and repeatedly applied/inserted or removed to removably fix the U-bolt connector sleeve to U-bolt 6 or to remove the U-bolt connector sleeve from the U-bolt. Opening(s)/passage(s) 18 of U-bolt connector sleeve 8 locates a restraining device, such as a push pin, bolt, spring loaded pin, slam latch, rotary latch, lock, or other mechanism that can be quickly and repeatedly applied and/or removed, to bear against inner surface 20. Holes 22 are shown defined by a solid portion of sleeve 8 (i.e., cavity 12 does not extend into the solid portion) for attaching an accessory mount assembly, for example a ladder mount assembly.

Figure 3:
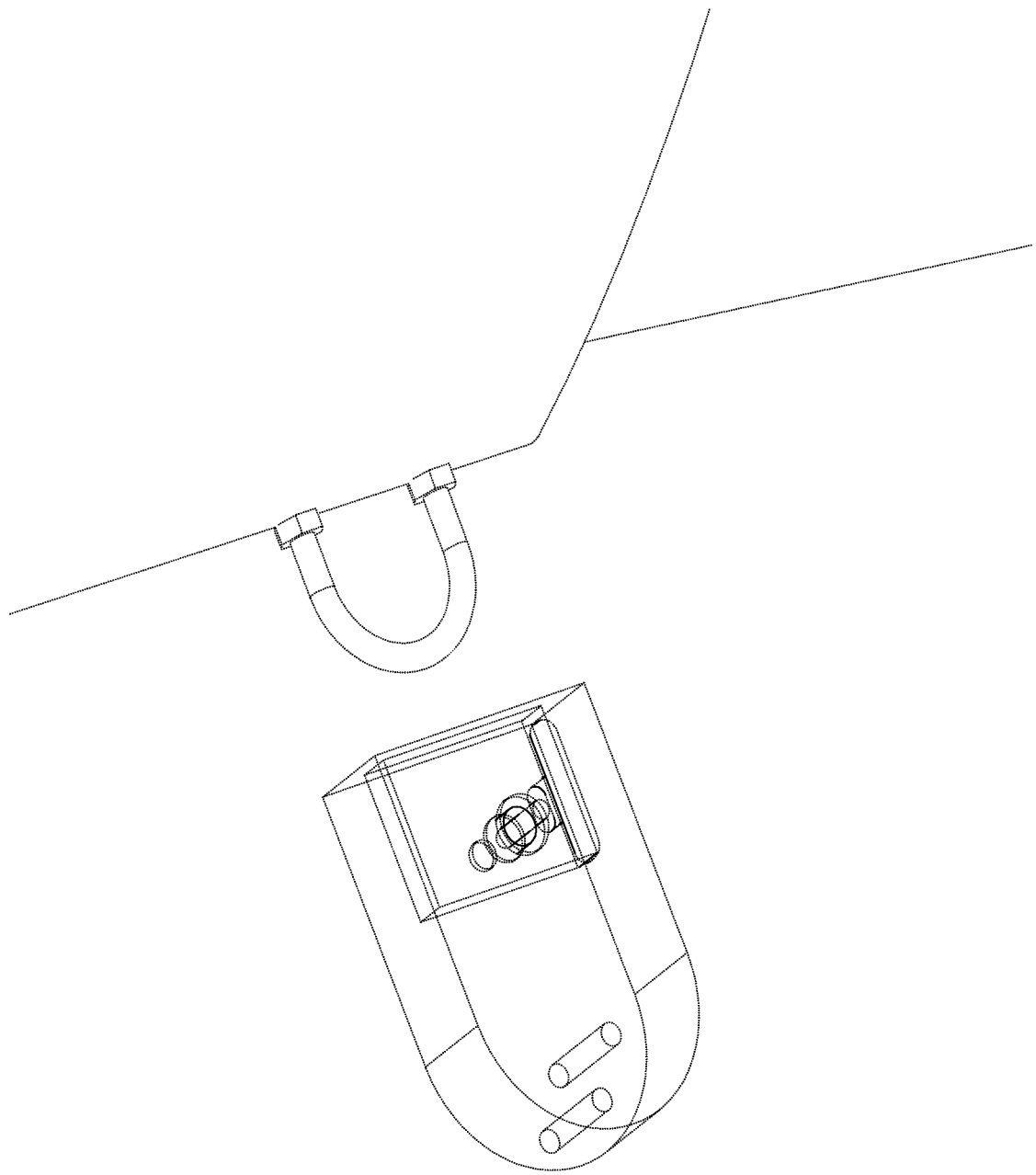
FIG. 3 illustrates one example of a U-bolt connector sleeve incorporating a spring-loaded pull pin restraining device before being attached to a bow mounted U-bolt according to various embodiments described herein.

FIG. 3 illustrates a close-up view of a U-bolt connector sleeve incorporating a spring-loaded pin located by opening 18 before the sleeve is attached to a U-bolt mounted in the bow of a boat.

Figure 4:
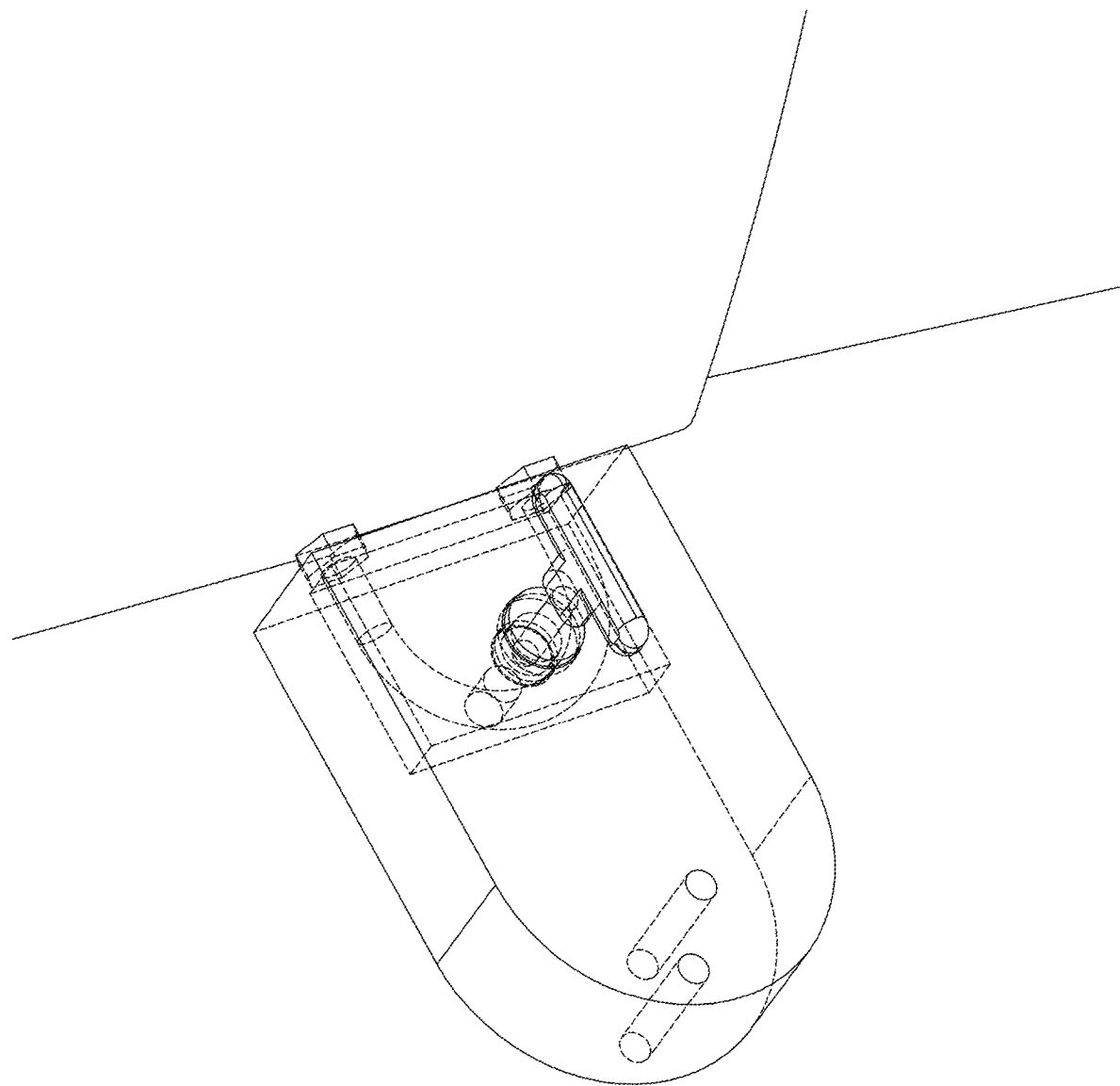
FIG. 4 illustrates a close-up view of one example of a U-bolt connector sleeve incorporating a spring-loaded pull pin restraining device to contact the inner radius of a U-bolt mounted in the bow of a boat according to various embodiments described herein.

FIG. 4 shows a close-up view of a U-bolt connector sleeve incorporating a spring-loaded pin located by opening 18 attached to a U-bolt mounted in the bow of a boat.

Figure 5:
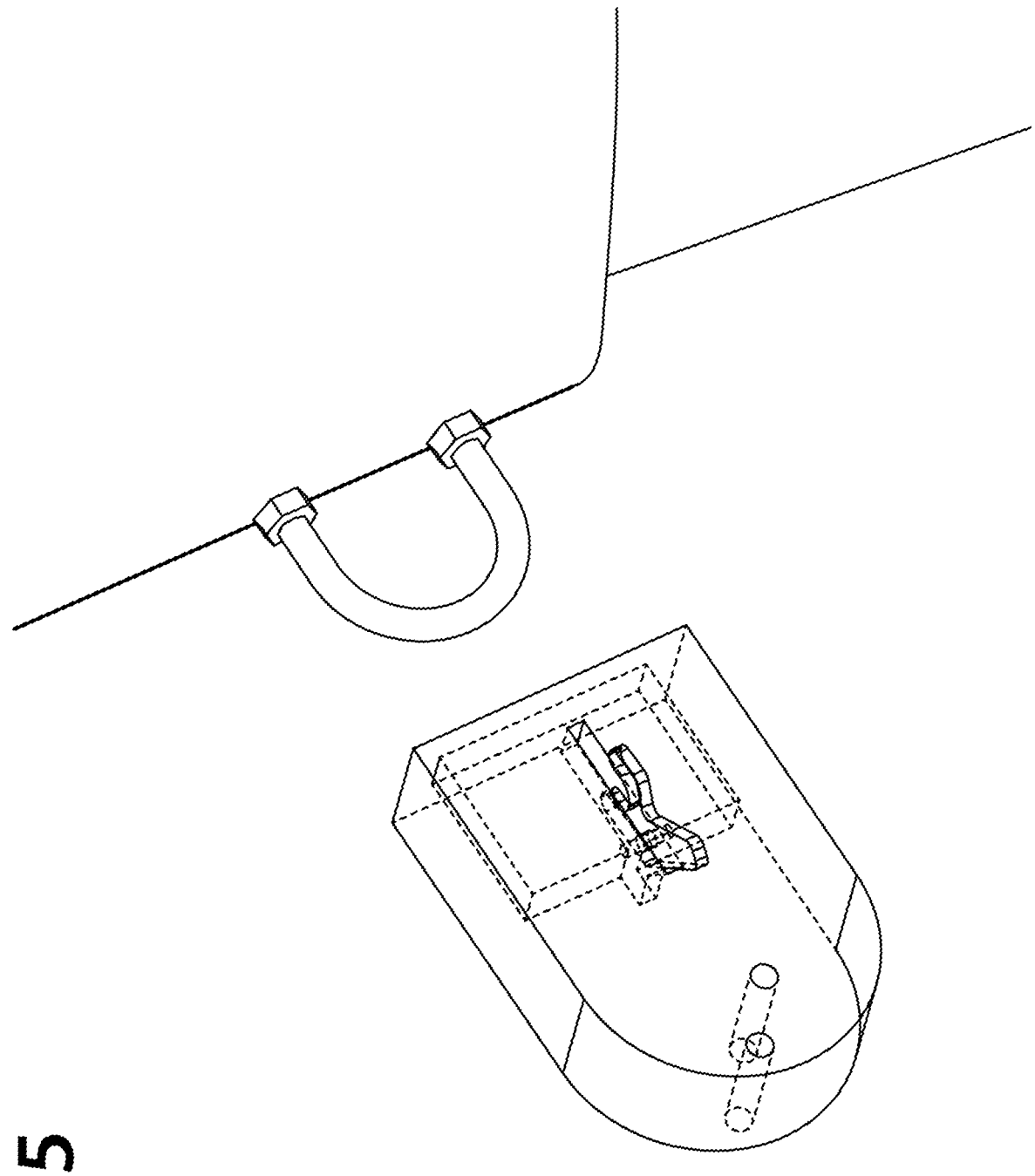
FIG. 5 illustrates one example of a U-bolt connector sleeve incorporating a rotary latch restraining device before being attached to a bow mounted U-bolt according to various embodiments described herein.

FIG. 5 illustrates a close-up view of a U-bolt connector sleeve incorporating a rotary latch located by opening 18 before the sleeve is attached to a U-bolt mounted in the bow of a boat.

Figure 6:
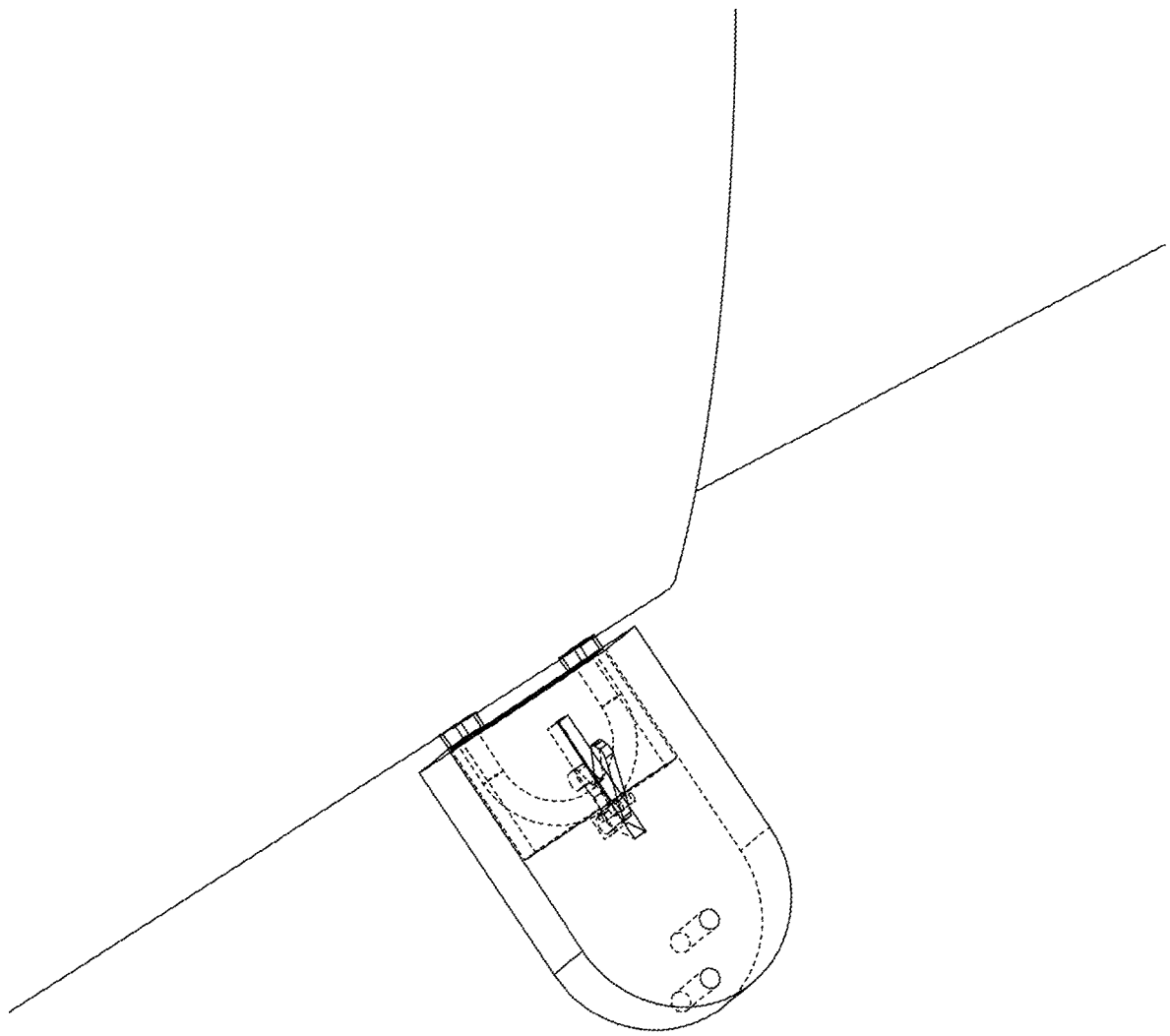
FIG. 6 illustrates a close-up view of one example of a U-bolt connector sleeve incorporating a rotary latch restraining device to contact the inner radius of a U-bolt mounted in the bow of a boat according to various embodiments described herein.

FIG. 6 depicts 3 illustrates a close-up view of a U-bolt connector sleeve incorporating a rotary latch located by opening 18 attached to a U-bolt mounted in the bow of a boat.

Figure 7:
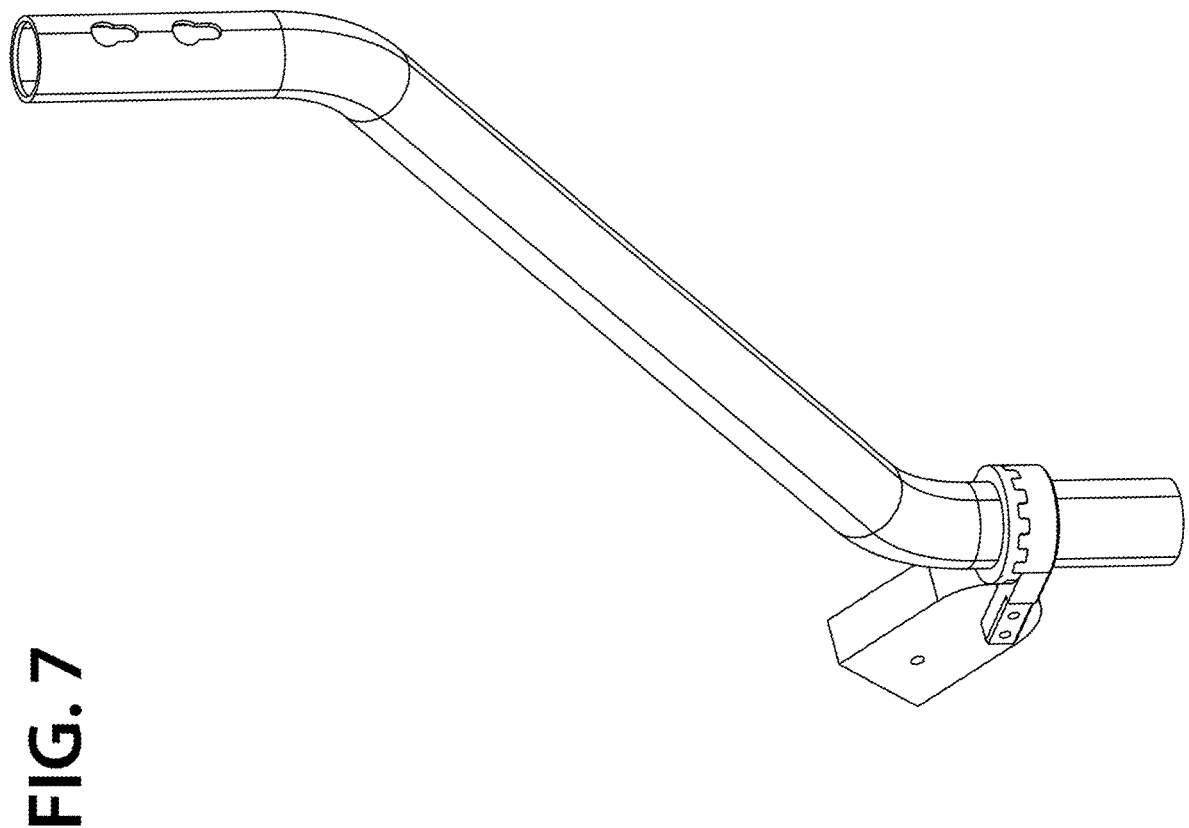
FIG. 7 illustrates one example of an assembly including a U-bolt connector sleeve, adjustable ladder mount holder, and ladder mount which can be quickly and securely repositioned for mounting a ladder or steps according to various embodiments described herein.

The embodiment depicted in FIG. 7 shows an assembly of a U-bolt connector sleeve and an adjustable ladder mount assembly. The adjustable ladder mount assembly incorporates indexing teeth to allow the ladder mount to be easily rotated into position and secured. The ladder mount may incorporate an offset portion to mount the ladder at an elevation and distance from U-bolt 6 so that the ladder clears bow 4 and sides of the boat and is roughly perpendicular to the gunnel of the boat. The end of the ladder mount incorporates features for the quick, easy, and secure mounting of readily available nautical ladders.

Figure 8:
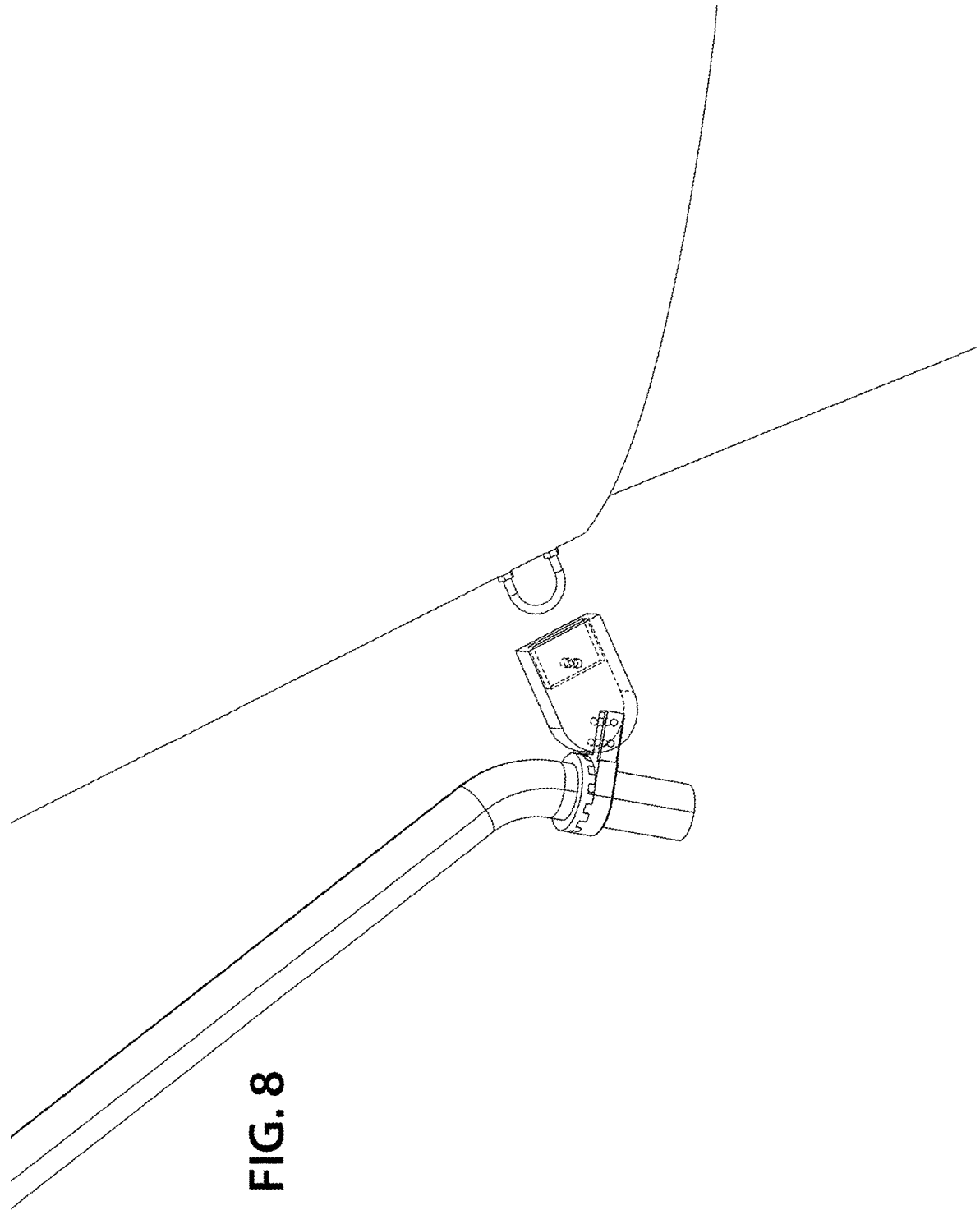
FIG. 8 illustrates a close-up view of one example of an assembly including a U-bolt connector sleeve, adjustable ladder mount holder, and ladder mount before attaching to a bow mounted U-bolt according to various embodiments described herein.

FIG. 8 illustrates a close-up view of an assembly of a U-bolt connector sleeve and an adjustable ladder mount assembly before attachment to a U-bolt mounted in the bow of a boat.

Figure 9:
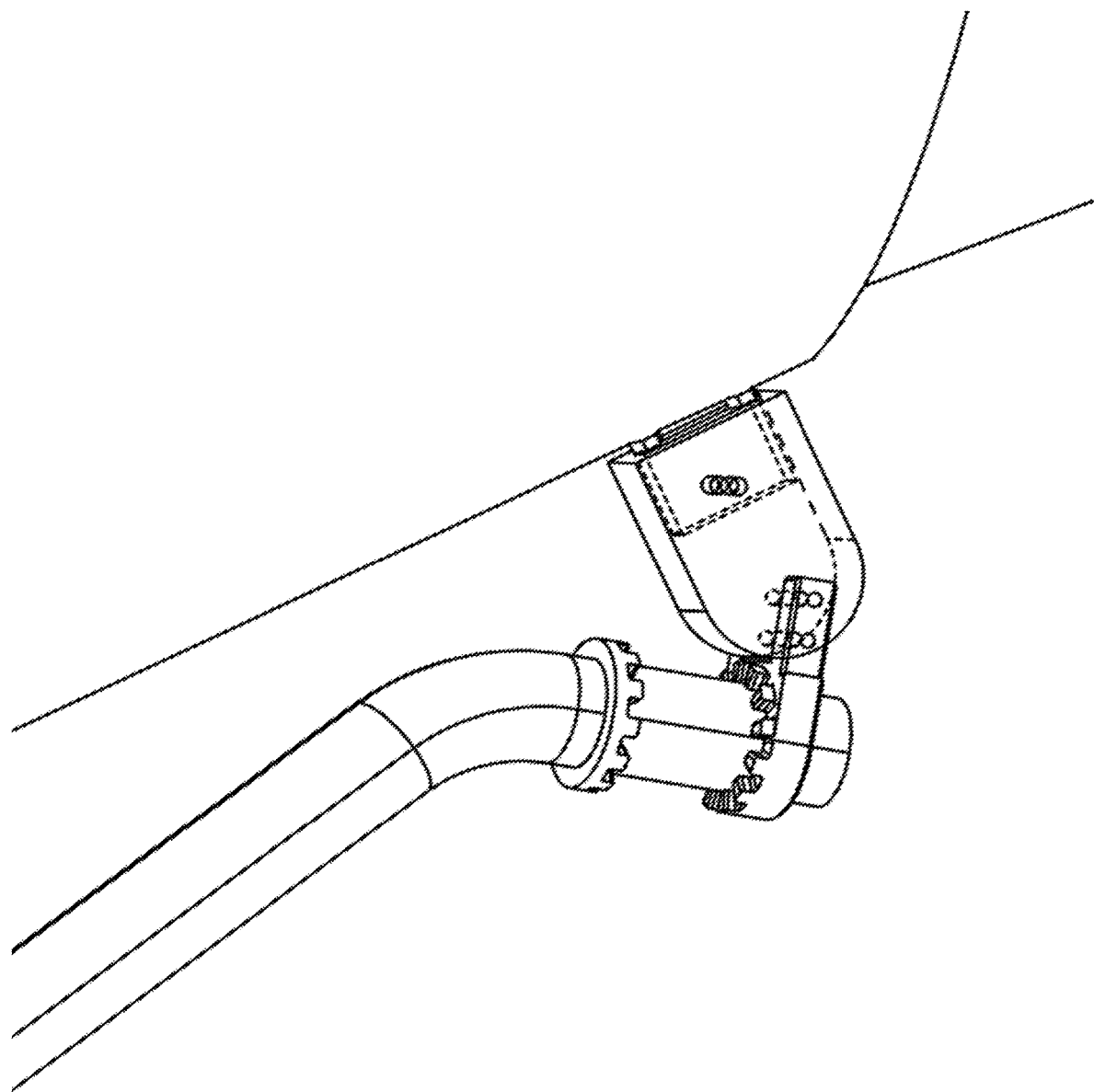
FIG. 9 illustrates a close-up view of one example of a ladder mount being repositioned after the assembly has been attached to a bow mounted U-bolt according to various embodiments described herein.

FIG. 9 depicts the ladder mount being rotated into a new position.

Figure 10:
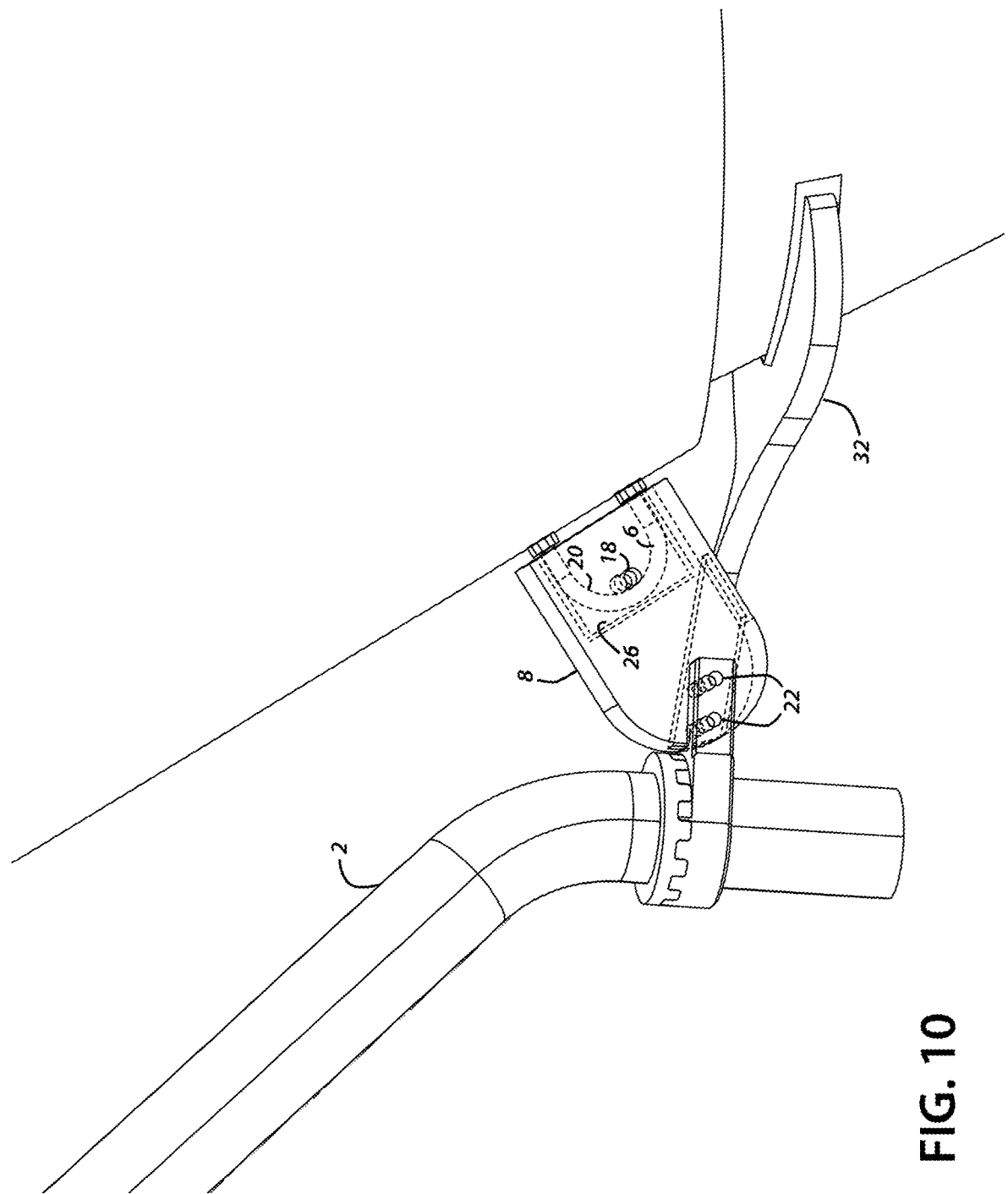
FIG. 10 illustrates a close-up view of one example of an assembly including a U-bolt connector sleeve with a bow brace, adjustable ladder mount holder, and ladder mount assembly incorporating a U-bolt connector sleeve with a contact surface to engage the outer radius of a U-bolt according to various embodiments described herein.

FIG. 10 illustrates an assembly of a bow brace/support 32, U-bolt connector sleeve 8 and an adjustable ladder mount assembly 10 attached to a U-bolt 6 mounted in/to the bow of a boat 4. The U-bolt connector sleeve depicted includes contact point 26 as represented in FIG. 2. Support 32 may attach to sleeve 8 via bolts through holes 22, which bolts may also secure mount assembly 10 to the sleeve. When a restraining device is removably installed into holes 18 and bears against surface 20, sleeve 8 is removably secured to U-bolt 6 with support 32 providing additional support for a load transferred from ladder 2 to U-bolt 6 via sleeve 8

Figure 11:
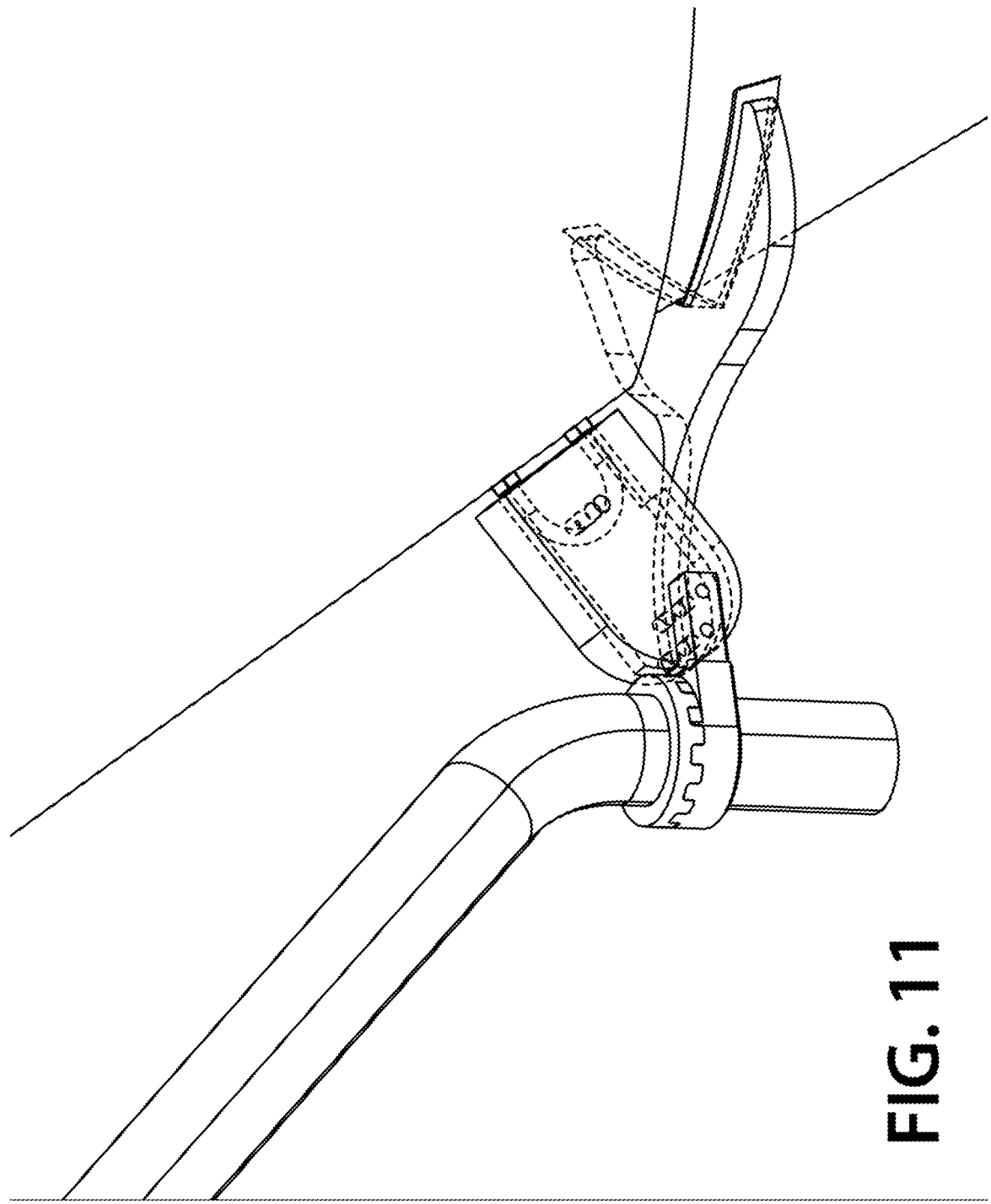
FIG. 11 illustrates a close-up view of one example of an assembly including U-bolt connector sleeve with bow brace, adjustable ladder mount holder, and ladder mount assembly incorporating a U-bolt connector sleeve without contact surface to engage the outer radius of a U-bolt according to various embodiments described herein.

FIG. 11 shows an assembly of a bow brace, U-bolt connector sleeve and an adjustable ladder mount assembly attached to a U-bolt mounted in the bow of a boat.

Figure 12:
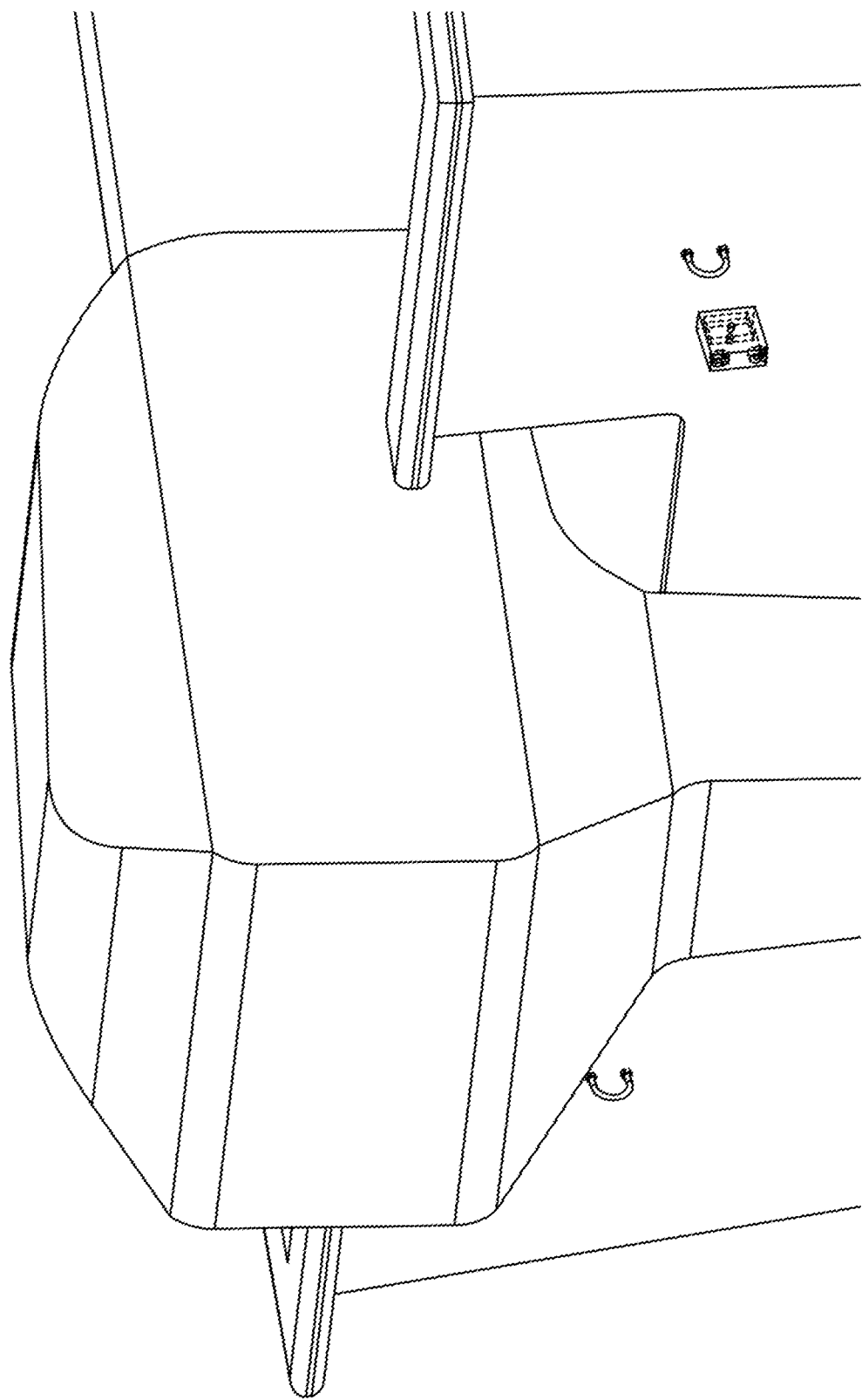
FIG. 12 illustrates a close-up view of one example of a U-bolt connector sleeve before it is attached to a U-bolt mounted in the transom of a boat according to various embodiments described herein.

FIG. 12 depicts a U-bolt connector sleeve before being attached to a U-bolt mounted in the transom of a boat.

Figure 13:
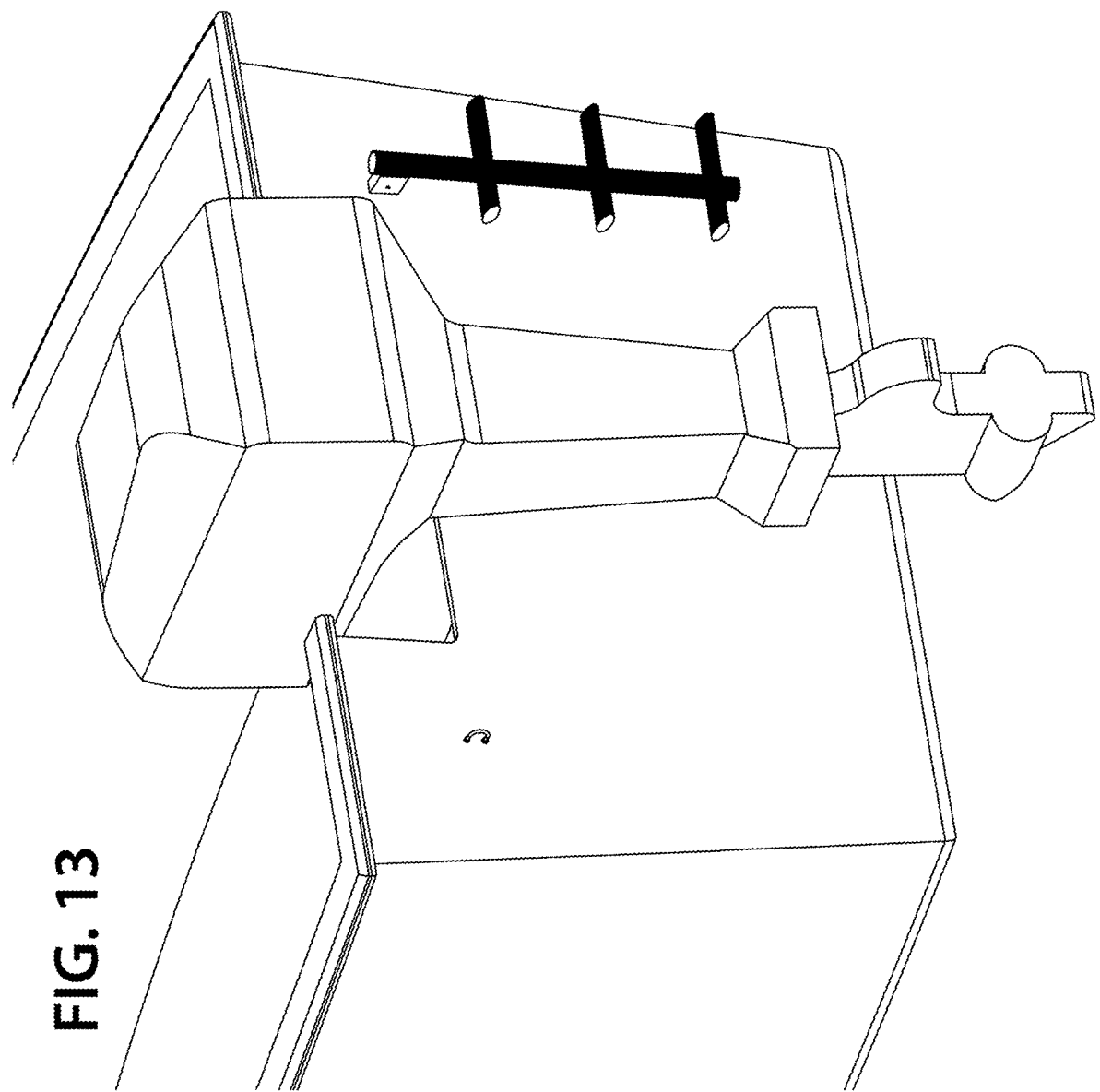
FIG. 13 illustrates one example of a U-bolt connector sleeve and ladder mounted onto a U-bolt in the transom of a boat according to various embodiments described herein.

FIG. 13 illustrates a U-bolt connector sleeve attached to a U-bolt mounted in the transom of a boat and a ladder attached to the U-bolt connector sleeve. Different embodiments would allow for the mounting of a ladder at different angles to the U-bolt connector sleeve and on different faces or sides of a U-bolt connector sleeve.

Figure 14:
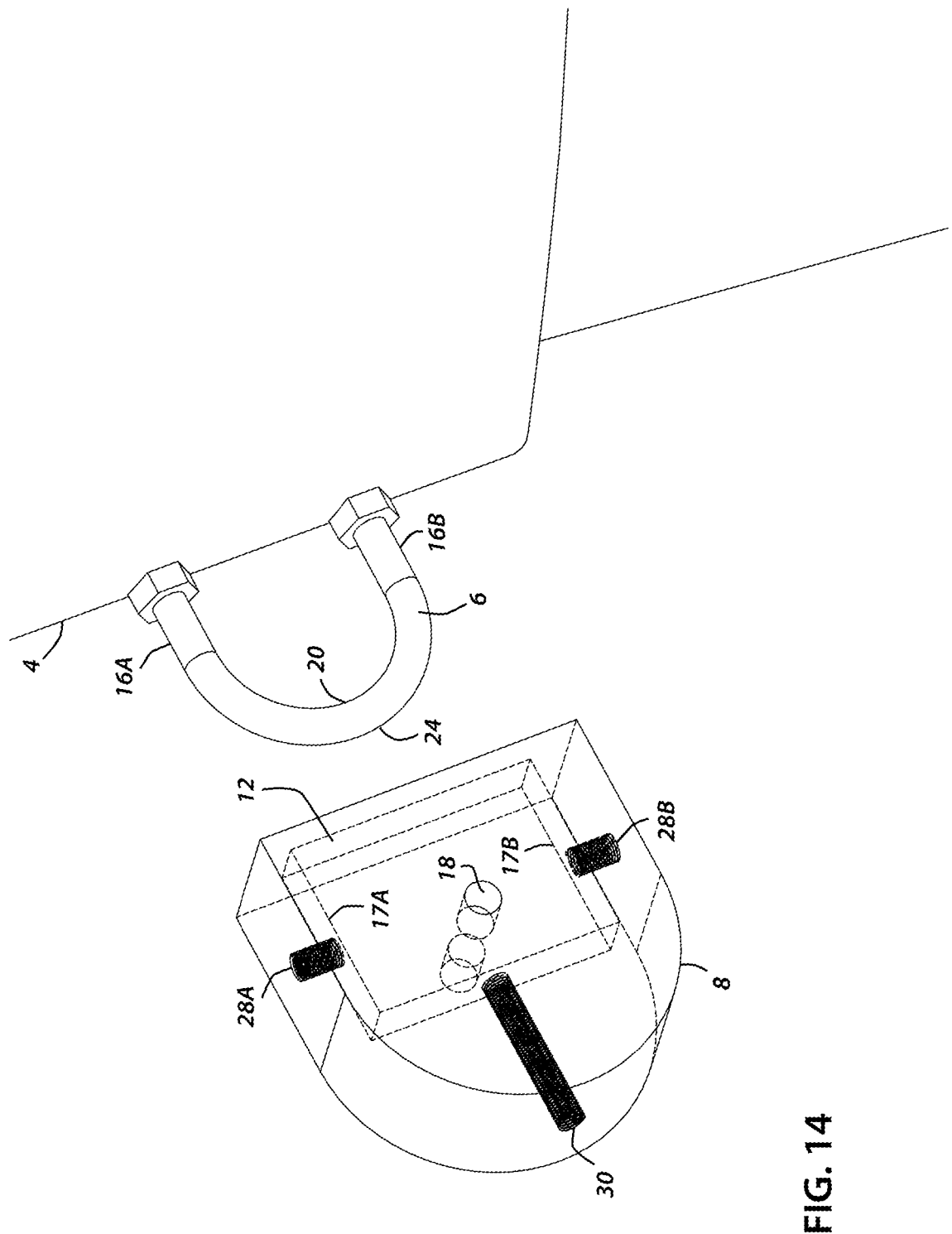
FIG. 14 Illustrates a U-bolt connector sleeve manufactured with set screws to provide adjustable contact points with surfaces of a U-bolt.

Turning now to FIG. 14, an embodiment is illustrated that shows set screws 28A and 28B penetrating into cavity 12 such that screws 28A and 28B bear against surfaces 16A and 16B, respectively. If the upper and lower surfaces of cavity 12 create an interference fit with surfaces 16A and 16B, respectively, set screws 28A and 28B may not be needed, or may not need to be tightened. But, if a slight clearance between upper and lower surfaces 17A and 17B and surfaces 16a and 16B exists, tightening set screws 28A and 28B may provide a more secure removable attachment of sleeve 8 to U-bolt 6. Similarly, set screw 30 may be tightened against surface 24 when a restraining device installed through hole(s) 18 exists with a clearance fit with surface 20.

Figure 15:
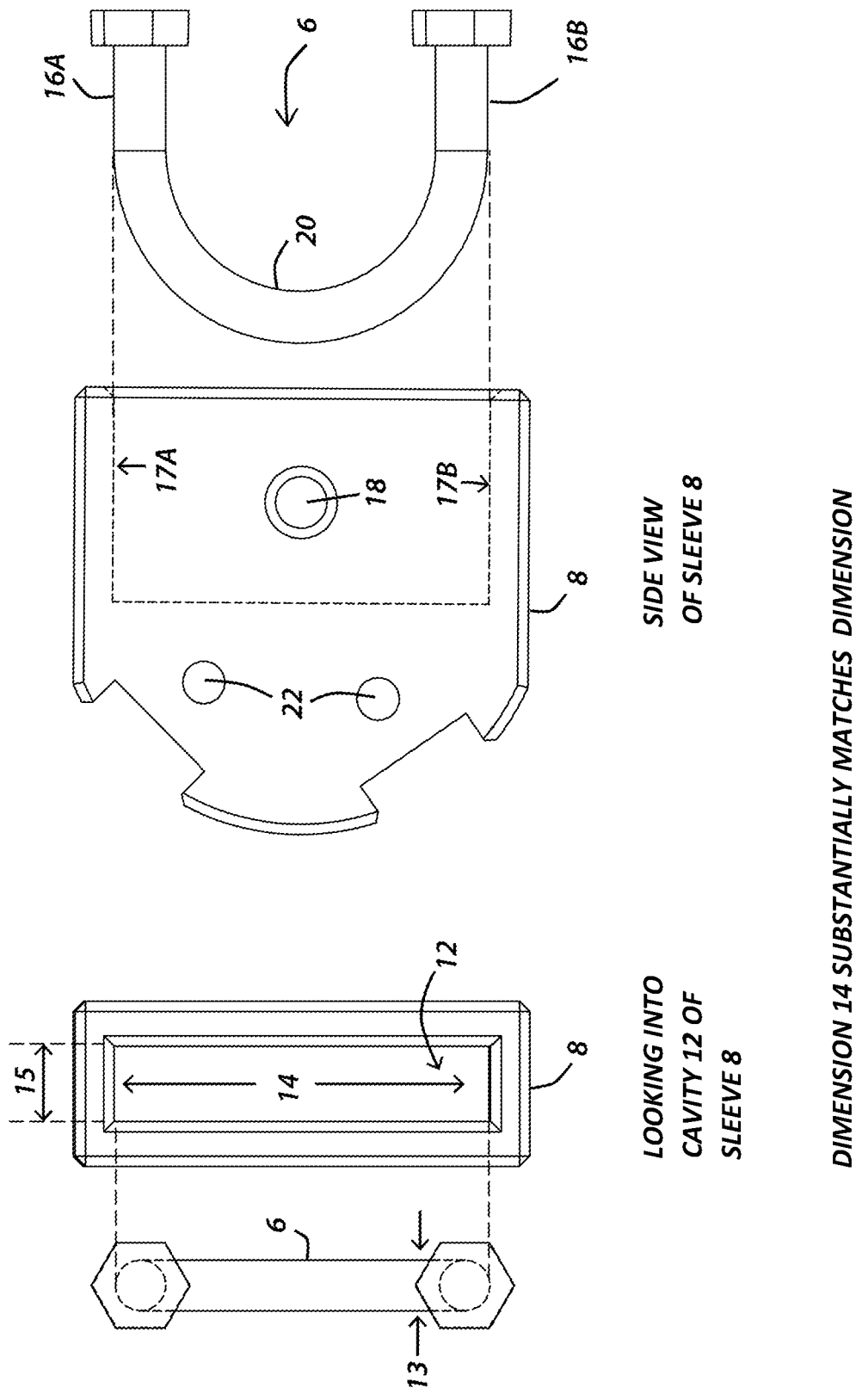
FIG. 15 Illustrates a view looking into a connection sleeve side-by-side with a U-bolt to show substantial equivalence between dimensions of the connector sleeve and dimensions between contact points of the U-bolt.

Turning now to FIG. 15, the figure illustrates dimension 14 between upper surface 17A and lower surface 17B of cavity 12 being substantially the same as the dimension between surfaces 16A and 16B of U-bolt 6. Similarly, dimension 15 between the side surfaces o cavity 12 is shown being substantially similar to dimension 13, which is the thickness of U-bolt 6.

What is claimed is:

1. A connector sleeve that facilitates removably attaching an accessory to a boat, comprising:
    a body defining a cavity and one or more restraining device location passages to locate a restraining device;
    wherein the one or more restraining device location passages locate the restraining device such that the restraining device bears against an inner surface of a U-bolt to securely removably couple the connector sleeve with the U-bolt when the connector sleeve has been slid over the U-bolt and when one of the restraining device location passages has received the restraining device;
    and wherein the connector sleeve defines one or more attachment passages to attach an accessory mount to the connector sleeve.

2. The connector sleeve of claim 1 wherein the cavity has an upper surface and a lower surface and wherein the upper surface and the lower surface are separated by a dimension that is less than a dimension between a first outer surface and a second outer surface of the U-bolt such that an interference fit exists between the upper and lower surfaces and respective first and second outer surfaces that correspond thereto when the connector sleeve is slid over the U-bolt.

3. The connector sleeve of claim 1 wherein the cavity has an upper surface and a lower surface and wherein the upper surface and the lower surface are separated by a dimension that is greater than a dimension between a first outer surface and a second outer surface of the U-bolt such that a clearance fit exists between the upper and lower surfaces and respective first and second outer surfaces that correspond thereto when the connector sleeve is slid over the U-bolt.

4. The connector sleeve of claim 3 wherein the connector sleeve includes at least set screw penetration that directs at least one set screw in a direction toward one of one or more of the outer surfaces of the U-bolt when the at least one set screw is turned to move the at least one set screw toward the outer surfaces of the U-bolt.

5. The connector sleeve of claim 3 wherein the connector sleeve includes a set screw penetration that directs a set screw in a direction toward an outer radius surface of the U-bolt when a restraining device installed through the one or more restraining device location passages exists with a clearance between the restraining device and an inner radius surface of the U-bolt.

6. The connector sleeve of claim 1 wherein the cavity has an upper surface and a lower surface and wherein the upper surface and the lower surface are separated by a dimension that is the same as a dimension between a first outer surface and a second outer surface of the U-bolt.

7. A system to removably attach an accessory to a boat, comprising:
    a restraining device;
    a connector sleeve, comprising:
        a body defining a cavity and a restraining device location passage to locate the restraining device;
        wherein the restraining device location passage locates the restraining device such that the restraining device bears against an inner surface of a U-bolt to securely removably couple the connector sleeve with the U-bolt when the connector sleeve has been slid over the U-bolt and when the restraining device location passage has received the restraining device;
        and wherein the connector sleeve defines one or more attachment passages to attach an accessory mount to the connector sleeve.

8. The system of claim 7 wherein the cavity of the connector sleeve has an upper surface and a lower surface and wherein the upper surface and the lower surface are separated by a dimension that is less than a dimension between a first outer surface and a second outer surface of the U-bolt such that an interference fit exists between the upper and lower surfaces and the respective first and second outer surfaces that correspond thereto when the connector sleeve is slid over the U-bolt.

9. The system of claim 7 wherein the cavity of the connector sleeve has an upper surface and a lower surface and wherein the upper surface and the lower surface are separated by a dimension that is greater than a dimension between and first outer surface and the second outer surface of the U-bolt such that a clearance fit exists between the upper and lower surfaces and the respective first and second outer surfaces that correspond thereto when the connector sleeve is slid over the U-bolt.

10. The system of claim 9 wherein the connector sleeve includes set screw penetrations that direct set screws in a direction toward one or more of the outer surfaces of the U-bolt when the set screws are turned to move the set screws toward the outer surfaces of the U-bolt.

11. The system of claim 9 wherein the connector sleeve includes a set screw penetration that directs a set screw in a direction toward an outer radius surface of the U-bolt when a restraining device installed through the one or more restraining device location passages exists with a clearance between the restraining device and an inner radius surface of the U-bolt.

12. The system of claim 7 wherein the restraining device is one of: a bolt, a pin, or a latch.

13. The system of claim 7 wherein the cavity of the connector sleeve has an upper surface and a lower surface and wherein the upper surface and the lower surface are separated by a dimension that is the same as a dimension between a first outer surface and a second outer surface of the U-bolt.

14. A method, comprising:
sliding a connector sleeve over a U-bolt that is mounted to a boat, wherein the connection sleeve comprises:
a body defining a cavity and a restraining device location passage to locate a restraining device;
wherein the restraining device location passage locates the restraining device such that the restraining device bears against an inner surface of the U-bolt to securely removably couple the connector sleeve with the U-bolt when the connector sleeve has been slid over the U-bolt and when one of the restraining device location passages has received the restraining device;
and wherein the connector sleeve defines one or more attachment passages to attach an accessory mount to the connector sleeve; and
removably securing the connector sleeve to the U-bolt by inserting a restraining device into the restraining device location passage.

15. The method of claim 14 further comprising attaching an accessory mount to the connector sleeve by inserting one or more of a bolt or a pin through the one or attachment passages.

16. The method of claim 14 wherein the step of removably securing the connector sleeve to the U-bolt further comprises tightening one or more set screws;
wherein the cavity of the connector sleeve has an upper surface and a lower surface and wherein the upper surface and the lower surface are separated by a dimension that is greater than a dimension between a first outer surface and the second outer surface of the U-bolt such that a clearance fit exists between the upper and lower surfaces and the respective first and second outer surfaces that correspond thereto when the connector sleeve is slid over the U-bolt; and
wherein the connector sleeve includes set screw penetrations that direct the one or more set screws in a direction toward one or more of the outer surfaces of the U-bolt when the one or more set screws are turned in a direction that cause the set screws to move toward the outer surfaces of the U-bolt.

17. The method of claim 14 wherein the step of removably securing the connector sleeve to the U-bolt further comprises tightening a set screw;
wherein the connector sleeve includes a set screw penetration that directs the set screw in a direction toward an outer radius surface of the U-bolt when the restraining device installed through the restraining device location passage exists with a clearance between the restraining device and an inner radius surface of the U-bolt.

18. The method of claim 14 wherein the cavity of the connector sleeve has an upper surface and a lower surface and wherein the upper surface and the lower surface are separated by a dimension that is the same as a dimension between a first outer surface and the second outer surface of the U-bolt.

* * * * *